(12) United States Patent
Schulte

(10) Patent No.: US 7,970,063 B2
(45) Date of Patent: Jun. 28, 2011

(54) VARIABLE LIFTOFF VOLTAGE PROCESS FIELD DEVICE

(75) Inventor: John P. Schulte, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 639 days.

(21) Appl. No.: 12/045,248

(22) Filed: Mar. 10, 2008

(65) Prior Publication Data
US 2009/0224730 A1 Sep. 10, 2009

(51) Int. Cl.
*H04L 27/00* (2006.01)
(52) U.S. Cl. ............................................ 375/259
(58) Field of Classification Search .............. 375/259, 375/260, 376; 323/232, 234, 282, 265, 266; 340/635, 508
See application file for complete search history.

(56) References Cited

U.S. PATENT DOCUMENTS

| | | | |
|---|---|---|---|
| 4,015,609 A | 4/1977 | Mensink et al. | 128/419 PG |
| 4,206,297 A | 6/1980 | Hoff et al. | 323/22 |
| 4,206,397 A | 6/1980 | Dahlke | 323/22 |
| 4,413,224 A | 11/1983 | Krupka et al. | 323/222 |
| 4,502,318 A | 3/1985 | Converse, III et al. | 73/3 |
| 4,606,076 A | 8/1986 | Davis | 455/343 |
| 4,621,551 A | 11/1986 | Silverman | 82/31 |
| 4,755,773 A | 7/1988 | Ohmagari | 332/9 |
| 4,804,958 A | 2/1989 | Longsdorf | 340/860 |
| 4,833,922 A | 5/1989 | Frick et al. | 73/756 |
| 4,866,435 A | 9/1989 | Frick | 340/870.16 |
| 4,889,179 A | 12/1989 | Merenda | 165/14 |
| 4,916,381 A | 4/1990 | Gelecinskyj et al. | 323/285 |
| 4,970,451 A | 11/1990 | Suomalainen | 323/222 |
| 5,087,871 A | 2/1992 | Losel | 323/299 |
| 5,089,974 A | 2/1992 | Demeyer et al. | 364/492 |
| 5,146,401 A | 9/1992 | Bansal et al. | 364/138 |
| 5,179,488 A | 1/1993 | Rovner | 361/18 |
| 5,184,094 A | 2/1993 | Kohler | 331/158 |
| 5,187,474 A | 2/1993 | Kielb et al. | 340/870 |
| 5,245,333 A | 9/1993 | Anderson et al. | 340/870 |

(Continued)

FOREIGN PATENT DOCUMENTS

DE 2229897 3/1990

(Continued)

OTHER PUBLICATIONS

Brochure: "Preliminary LTC1149, LTC1149-3.3., LTC 1149-5; High Efficiency Synchronous Stepdown Switching Regulator", Linear Technology Corp. Milpitas, CA, pp. 1-16, Nov. 1992.

(Continued)

*Primary Examiner* — Khai Tran
(74) *Attorney, Agent, or Firm* — Westman, Champlin & Kelly, P.A.

(57) ABSTRACT

A field transmitter includes field device circuitry configured to measure or control a process variable. A first process control loop terminal is configured to couple to a two-wire process control loop which carries a loop current. A second process control loop terminal configured to couple to the two-wire process control loop. A switching regulator has an input and an output. The output is coupled to the transmitter circuitry and arranged to provide power to the transmitter circuitry. A variable voltage source having an input electrically coupled to the first process control loop terminal, and a voltage output coupled to the input of the switching regulator and a control input. The voltage output is a function of the control input.

15 Claims, 7 Drawing Sheets

U.S. PATENT DOCUMENTS

| | | | |
|---|---|---|---|
| 5,258,868 A | 11/1993 | Jensen et al. | 359/168 |
| 5,333,114 A | 7/1994 | Warrior et al. | 364/550 |
| 5,360,997 A | 11/1994 | Watson | 323/268 |
| 5,377,090 A | 12/1994 | Steigerwald | 363/20 |
| 5,535,243 A | 7/1996 | Voegele et al. | 375/259 |
| 5,541,860 A | 7/1996 | Takei et al. | 702/141 |
| 5,606,513 A | 2/1997 | Louwagie et al. | 364/510 |
| 5,610,552 A | 3/1997 | Schlesinger et al. | 327/560 |
| 5,659,206 A | 8/1997 | Taguchi et al. | 307/11 |
| 5,710,552 A | 1/1998 | McCoy et al. | 340/870.21 |
| 5,764,891 A | 6/1998 | Warrior | 395/200.2 |
| 5,973,942 A | 10/1999 | Nelson et al. | 636/21.01 |
| 6,178,101 B1 | 1/2001 | Shires | 363/39 |
| 6,313,616 B1 | 11/2001 | Deller et al. | 323/282 |
| 6,489,755 B1 | 12/2002 | Boudreaux et al. | 323/282 |
| 6,577,516 B1 | 6/2003 | Thoren et al. | 363/84 |
| 6,646,362 B2 | 11/2003 | Bert et al. | 307/130 |
| 6,680,690 B1 | 1/2004 | Nilsson et al. | 342/124 |
| 6,806,693 B1 | 10/2004 | Bron | 323/280 |
| 6,813,318 B1 | 11/2004 | Westfield et al. | 375/295 |
| 7,187,158 B2 * | 3/2007 | Huisenga et al. | 323/282 |
| 2002/0101748 A1 | 8/2002 | Loechner | 363/84 |
| 2005/0030185 A1* | 2/2005 | Huisenga et al. | 340/635 |
| 2005/0231182 A1 | 10/2005 | Huisenga et al. | 323/282 |
| 2005/0289276 A1 | 12/2005 | Karschnia et al. | 710/305 |
| 2007/0152645 A1 | 7/2007 | Orth | 323/275 |
| 2009/0309558 A1* | 12/2009 | Kielb | 323/234 |

FOREIGN PATENT DOCUMENTS

| | | |
|---|---|---|
| DE | 4021258 | 1/1991 |
| DE | 4021258 A1 | 1/1991 |
| EP | 0 529 391 A1 | 6/1998 |
| GB | 2229897 A | 3/1990 |
| WO | WO 94/01764 | 1/1994 |
| WO | WO 02/09268 | 1/2002 |

OTHER PUBLICATIONS

Ullrich Von Seckendorff and Karen Speers, "Selecting an Inrush Current Limiter," *Electronic Products*, Jan. 1995, pp. 25-33.

"Electronics Letters an International Publication," The Institution of Electrical Engineers, Aug. 29, 1996, vol. 32, No. 18, pp. 1629-1632.

"LM193/LM293/LM393/LM2903 Low Power Low Offset Voltage Dual Comparators", National Semiconductor, pp. 1-12, Jan. 1995.

"LT124/Series High Speed Current Mode Pulse Width Modulators," Linear Technology LT1241 Series, pp. 1-16, 1992.

A.S. Koslovski, "Fast Active Inrush Current Limiter for Boost-based Resistor Emulators," 16th International Telecommunications Energy Conference, Intelec '94, Vancouver, B.C., Canada, pp. 649-652, Oct. 30, 1994.

EPO Communication pursuant to Rules 161(1) and 162 EPC for Application No. 097209.4.3-1239 _PCT/US2009/001037 filed Feb. 19, 2009; date Oct. 19, 2010, 2 pages.

Brochure: "LM494, Pulse Width Modulated Control Circuit", National Semiconductor, 7 pages, Jun. 1989.

Brochure: "High-Efficiency, +5V Adjustable Step-Down Switching Regulator", Maxim Integrated Products, 8 pages, Dec. 1991.

Maxim Data sheet for Max 631/632/633 CMOS Fixed/Adjustable Output Step-Up Switching Regulators (Mar. 1990).

Article: "Getting Maximum Efficiency from a 4-20 mA transducer Power Supply," by Bernhard Konrad of Maxim Integrated Products, Sensors, pp. 74-75, Apr. 1996.

A.S. Koslovski, "Fast Active Inrush Current Limiter for Boost-based Resistor Emulators," 16$^{th}$ International Telecommunications Energy Conference, Intelec '94, Vancouver, B.C., Canada, pp. 649-652, Oct. 30, 1994.

* cited by examiner

VARIABLE LIFTOFF VOLTAGE PROCESS FIELD DEVICE

BACKGROUND OF THE INVENTION

The present invention relates to field devices. More specifically, the present invention relates to field devices, are powered by a two-wire process control loop.

Process devices are used in industrial process control systems to monitor and/or control industrial processes. A control device is a process device which is used to control the process. Example control devices include pumps, valves, actuators, solenoids, motors, mixers, agitators, breakers, crushers, rollers, mills, ball millers, kneaders, filters, blenders, cyclones, centrifuges, towers, dryers, conveyors, separators, elevators, hoists, heaters, coolers, and other such equipment. A transmitter is a process device which is used to sense (or monitor) operation of the process, for example by monitoring a process variable such as temperature, pressure, flow, etc. The monitored process variable is transmitted so that it can be used by other equipment in the process, for example by a central control room.

Two wire process field devices are process devices which are located at a remote location or otherwise require electrical power which is received entirely through a connection to a two wire process control loop. A two wire process control loop refers to a wiring system utilizing two wires and which is used to carry information related to the process being monitored or controlled. For example, one standard type of two wire process control loop uses a 4-20 mA current level to represent a process variable. In such a configuration, a transmitter can control the current level to a value, such as 10 mA, which is representative of a sensed process variable such as pressure.

In order to reduce the amount of wiring required to couple to a process device, many process devices are entirely powered with power received from the two-wire process control loop. Thus, the total amount of power available to the process device is limited. For example in a 4-20 mA current loop, the total power available is limited by the lowest level at which the current level can be set (for example 3.6 mA) and the maximum voltage drop available across the device (for example something less than 24 volts) in an intrinsic safe location. This is less than 0.09 watts available to power the device.

In many cases, the functionality of a process device is limited by the amount of power which is available from the two wire process control loop. For example, additional functionality may require addition computational capabilities from a microprocessor. This increased computational power requires greater electrical power and may exceed the power budget available from the loop. In order to increase the amount of power available to circuitry in a process field device, field devices typically utilize highly efficient power supplies to convert power received from the two wire process control loop into a regulated voltage level for use by internal circuitry. One type of power supply, the switching regulator, has been used in process devices due to its efficiency in providing a regulated supply voltage to components in a field device. For example, the use of switching regulators is described in U.S. Pat. No. 5,535,243, which issued Jul. 9, 1996, entitled POWER SUPPLY FOR FIELD MOUNTED TRANSMITTER and U.S. Pat. No. 5,973,942, which issued Oct. 26, 1999, entitled START UP CIRCUIT FOR DC POWERED FIELD INSTRUMENT. However, a switching regulator may introduce noise into the process control loop which may alter or otherwise detrimentally affect transmission of information on the loop.

SUMMARY

A field transmitter includes field device circuitry configured to measure or control a process variable. A first process control loop terminal is configured to couple to a two-wire process control loop which carries a loop current. A second process control loop terminal configured to couple to the two-wire process control loop. A switching regulator has an input and an output. The output is coupled to the transmitter circuitry and arranged to provide power to the transmitter circuitry. A variable voltage source having an input electrically coupled to the first process control loop terminal, and a voltage output coupled to the input of the switching regulator and a control input, wherein the voltage output is a function of the control input.

DETAILED DESCRIPTION

Figure 1:
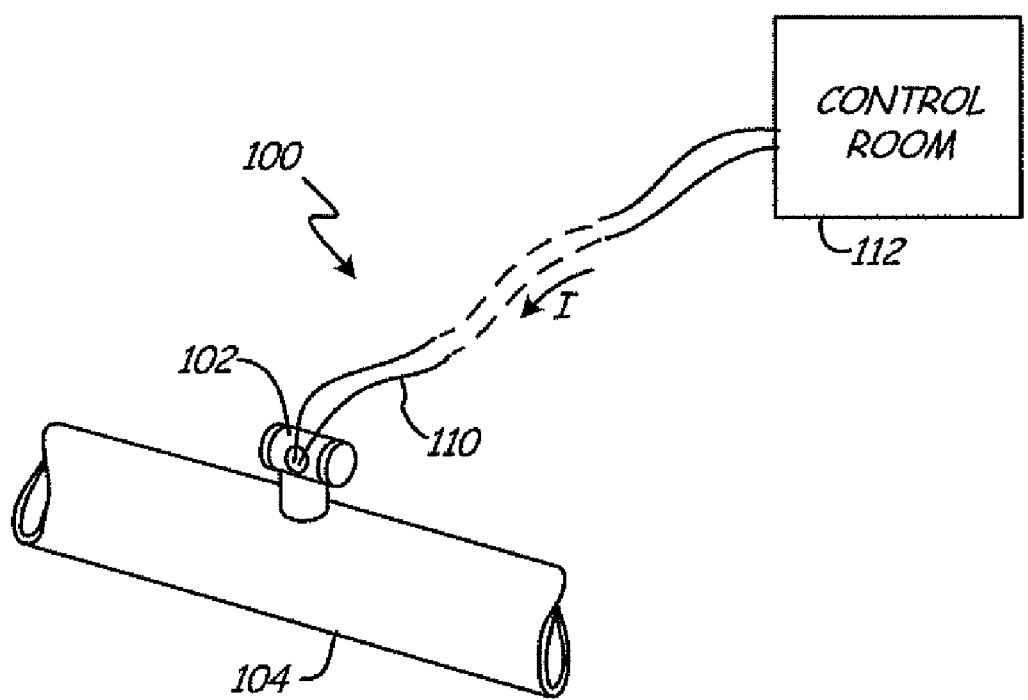
FIG. 1 is a simplified diagram showing a process control or monitoring system including a process device coupled to a two wire process control loop.

FIG. 1 is a simplified diagram of an industrial process control or monitoring system 100 in which one type of two wire process field device, a process transmitter 102, couples to an industrial process, specifically process piping 104. Transmitter 102 also couples to a two-wire process control loop 110 which connects to a control room 112. The process control loop 110 is illustrated as carrying a current I and may operate in accordance with any technique including industrial standards such as the HART® communication standard, a Fieldbus or Profibus standard, etc. Although a process transmitter 102 is described, the present invention can be implemented in any type of process device in which efficient power conversion is desired. Control room 112 can comprise a remote location for use by operators or other service personnel, or can comprise any termination or location along the process control loop 110 or other location.

Figure 2:
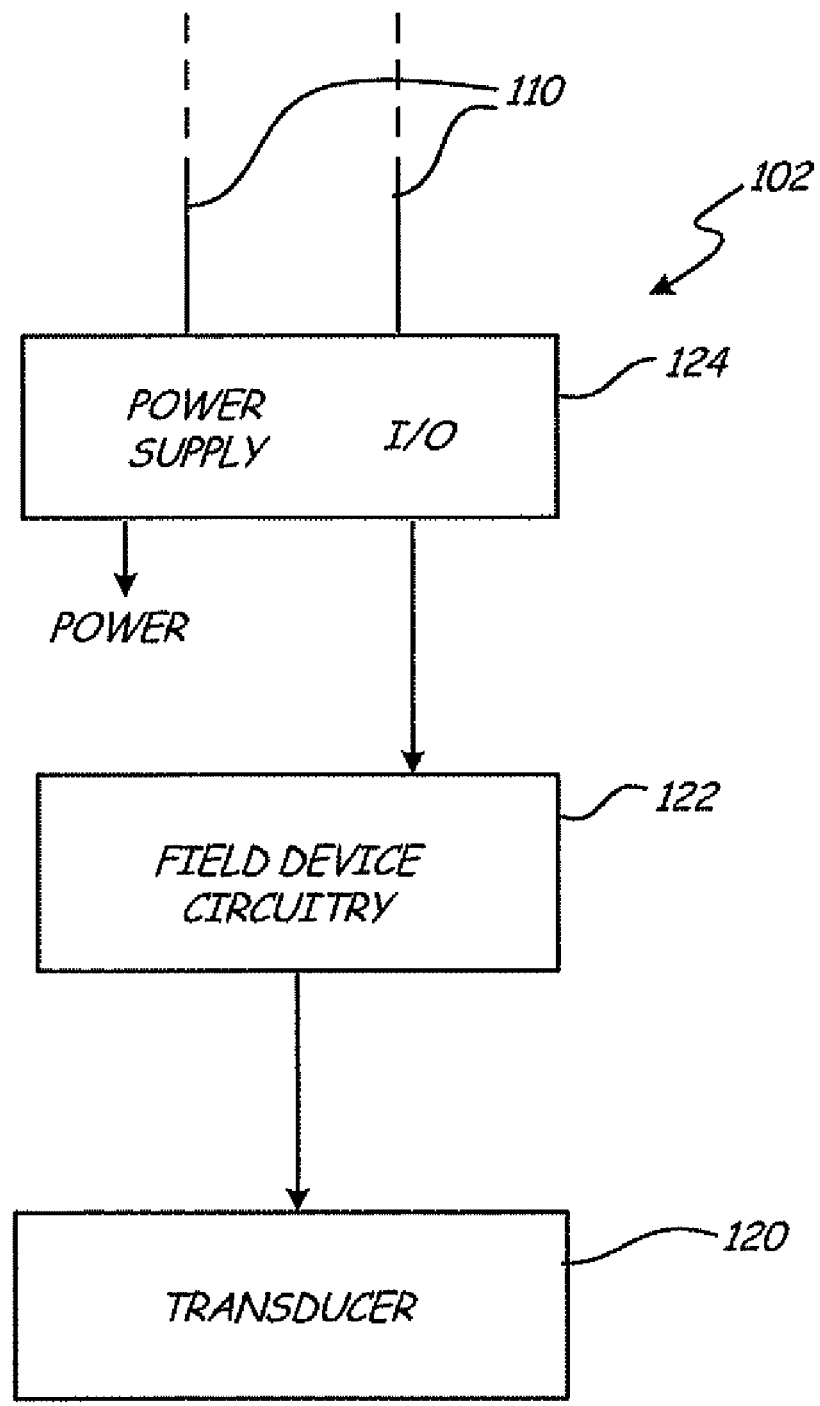
FIG. 2 is a simplified block diagram of circuitry in a field device including a power supply for providing power to the device.

FIG. 2 is a simplified block diagram of the transmitter 102 shown in FIG. 1. Transmitter 102 includes a transducer 120 for coupling to a process. For example, the transducer 120 can be a sensor such as a pressure, temperature or other sensor for measuring a process variable. In a field device which is capable of controlling the process, the transducer can comprise, for example, a valve, heating element, etc. Field device circuitry 122 couples to the transducer 120 and is used, for example, to calibrate or compensate process variable measurements, calculate process variables, perform diagnostics, or any other function which may be performed in a field device. In general, additional functionality in the field device circuitry 122 will increase the power requirements of the circuitry 122. A power supply and I/O circuit 124 is shown coupling to field device circuitry 122 and to the two wire process control loop 110. Circuitry 124 is used for communication over the two wire process control loop 110, for example to transmit a measured or calculated process variable over loop 110 to the control room 112 shown in FIG. 1. Circuitry 124 also provides a power output for providing all electrical power required by circuitry within the transmitter 102.

As discussed in the Background section, process field devices which are completely powered with power received from a process control loop may require a highly efficient voltage regulator in order to meet their power requirements. This may mean that a switching regulator is used to power the field device. One drawback of a switching regulator is that it requires a relatively large capacitor in order to operate without introducing noise into the system. This can be particularly problematic in environments in which large capacitance values cannot be used. For example, in order to meet intrinsic safety requirements, the amount of energy which a field device may store is limited. This makes it difficult to meet the requirements of having limited noise introduced into the two-wire communication link, low power draw from the two-wire communication loop along with maintaining the low capacitance necessary for intrinsic safety requirements.

Typical 4-20 mA field devices have a fixed lift off voltage and waste power. As used herein, "lift off value" is the minimum DC voltage required at the device terminals to ensure proper device operation. For example, at high loop current levels (e.g., 20 mA), a shunt regulator wastes power in its output transistor. Various techniques have been put forward to try to capture this normally wasted power.

On the other hand, in a typical loop with a load resistor, at low loop current values (e.g., 4 mA), the transmitter terminal voltage will be above the specified lift off voltage for the transmitter. This means that power is wasted in the regulator that is used to power the transmitter electronics. The present invention is directed to utilizing this normally wasted power. More specifically, with the present invention, the lift off voltage at low loop currents is raised and the extra power is used and made available to the transmitter electronics. Further, at high loop currents, the specified lift off voltage is lowered thereby causing the quiescent current to increase above 4 mA, but to remain below the desired loop current value. Therefore, the terminal voltage required to operate the device is related to the loop current. A higher terminal voltage is required at low loop currents (4 mA) and a lower terminal voltage is required at higher current values (20 mA).

Figure 3:
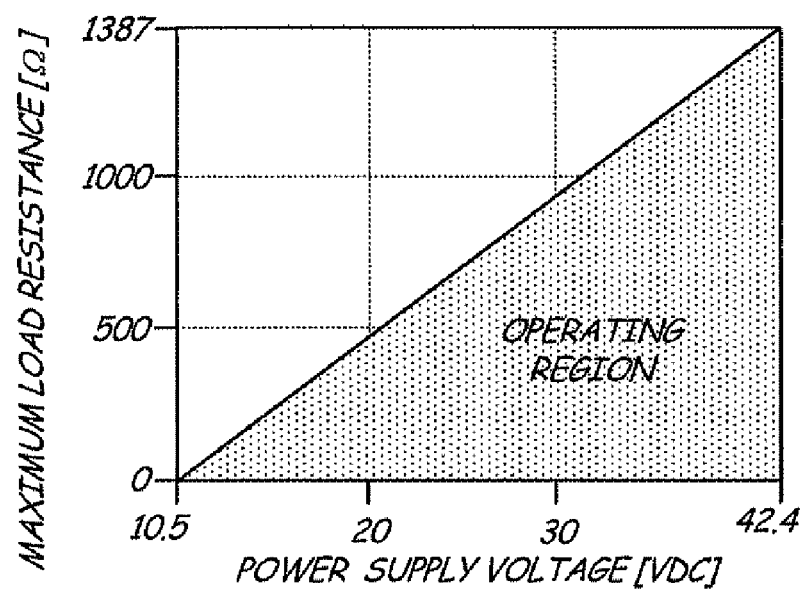
FIG. 3 is a graph of load in ohms versus voltage showing the load limit for a typical transmitter.

The present invention allows the efficient use of power in a process variable transmitter or other field device which is available from the loop power supply and load resistor. Typical product data sheets for field devices include a load limit chart to guide the operator in selecting a power supply and load resistor for a particular application. FIG. 3 is a graph of load resistance versus power supply voltage for a typical transmitter. This graph shows the maximum resistance of the load for a given loop power supply. Here, the load is the total loop resistance including the load resistor and other resistances such as from loop wiring and Intrinsic Safety barriers. In the graph of FIG. 3, the lift off voltage is 10.5 volts. This is the minimum voltage required at the transmitter terminals in order for the transmitter to operate.

Figure 4:
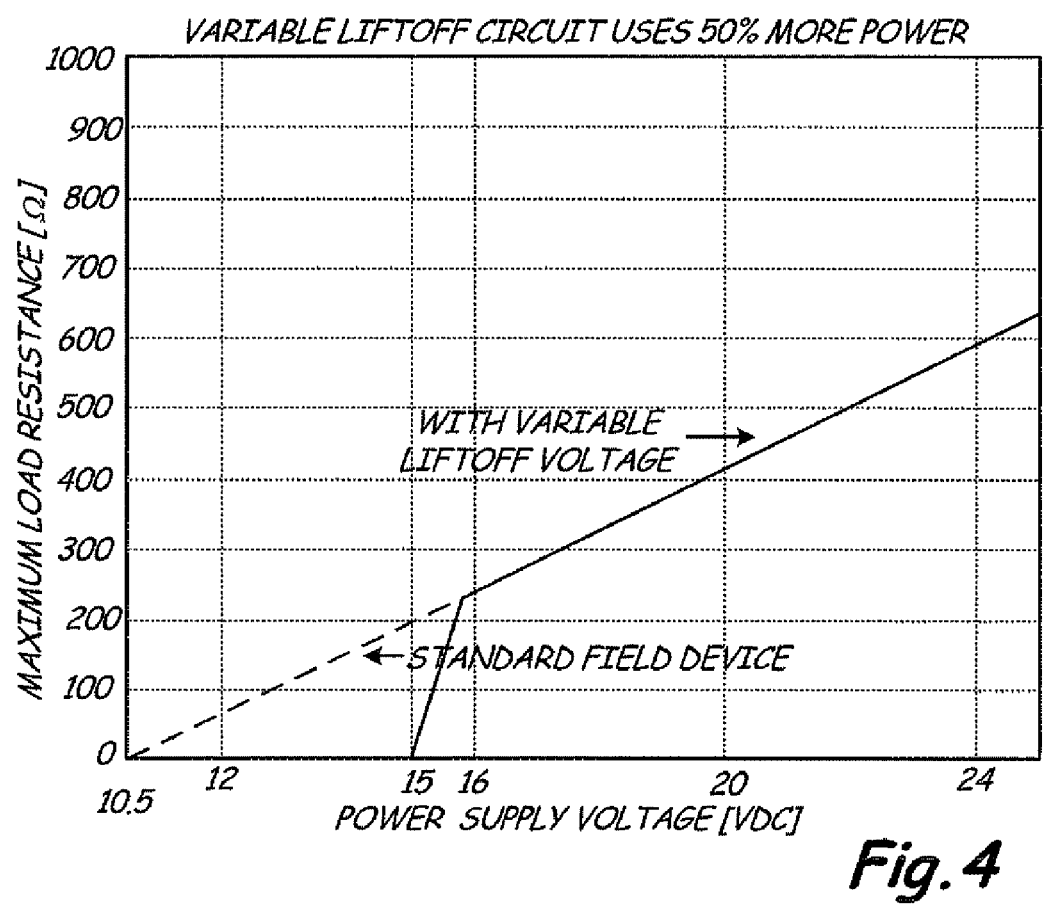
FIG. 4 is a graph of maximum load resistance versus power supply voltage for a field device having a variable lift off voltage in accordance with the present invention.

FIG. 4 is a graph of load resistance versus power supply voltage for a field device in accordance with the present invention. In FIG. 4, the dashed line (replicated from FIG. 3) shows the relationship for a standard field graph for a standard field device while the solid line shows the relationship between maximum load resistance and power supply voltage for a field device in accordance with one example of the present invention. With this configuration, the power budget has been increased. This configuration provides a field device with a lift off voltage of 15 volts, however, there is an "effective" lift off voltage of approximately 10.5 volts. For loop power supply voltages above 15.8, the load limit for the field device of the present invention illustrated in FIG. 4 is the same as the standard field device. Note that digital HART® communication requires a minimum load resistance of 250 ohms, such that a power supply greater than 15.8 volts is typically employed). Industry standard loop supply voltages are typically 24 to 40 volts. Therefore, in a typical configuration, the user will not be affected by the new field device configuration and may simply install and operate the field device in a standard manner. The present invention can be implemented using any appropriate technique. In one example, a variable pre-regulator architecture is used which provides a variable input voltage to a switching regulator. This configuration isolates the circuitry to block high loop voltages from the switching regulator and isolates noise from the switching regulator from entering the process control loop.

The following is a more detailed explanation of operation of the present invention. As discussed above, a process device requires a sufficient voltage, commonly referred to as the "lift off voltage", across its terminals for proper operation. An example of a typical "lift off voltage" is a constant, such as 12 volts. As long as the device has at least 12 volts across its terminal, the device will be capable of proper operation. A power supply which is used to operate the process control loop must be chosen such that it is large enough to supply the desired voltage drop across the device terminals under all operating conditions. Further, a load resistance is included in the process control loop which also introduces a voltage drop in the loop. The load resistance is typically at least 250 ohms, which is required to support current measurement and digital HART® communication. Other voltage drops include the voltage drop through the wiring and any intrinsic safety barriers. Thus, a typical power supply required to support a device with a 12 volt lift off voltage has a 24 volt output.

It is often desirable to lower the lift off voltage of a process device as this reduces any restrictions on the power supply which may be used to power the loop. However, devices with a lower lift off voltage generally have less power available for internal circuitry.

The minimum voltage available to a process device occurs when the loop current is at a maximum. This causes the maximum voltage drop across the load resistor, and other resistances sources of the loop and the minimum voltage at the device terminals. For example, in a process control loop with a 24 volt supply and a 500 ohms load resistance, when the loop is carrying 4 mA, the load resistor has a 2 volt drop. (Note that in this example other series resistance values such as from wiring and intrinsic safety barriers are ignored.) This results in a 22 volt drop across the device terminal giving 0.088 watts of available power. In contrast, when the loop is operating at a 20 mA, there is a 10 volt drop across the load resistor leaving only 14 volts available at the device terminals. Similarly, at 20 mA, the device power consumption is given by 20 mA×14 volts=0.28 watts. If the device circuitry only uses 0.015 watts, the remaining power is wasted through a shunt regulator circuit and simply converted into heat. This occurs at all current levels from 4 mA to 20 mA.

In contrast, with the present invention, this wasted power is used to lower the lift off voltage when the loop current is greater than 4 mA. This allows the quiescent current used by the device to increase. More specifically, the liftoff voltage of the device is made variable in order to recover some of the wasted power. This provides a number of advantages illustrated in the following examples.

Example 1

Example 1 illustrates the reduced restrictions required of the power supply and load resistance. In this example installation, a typical transmitter with a 12 volt lift off requirement is used with a 500 ohm load resistance. The minimum power supply is:

$$V_{ps}(min)=12V+20\ mA \times 500\Omega=22V \qquad \text{EQ. 1}$$

However, if a field device having a variable lift off voltage in accordance with the invention is implemented, a smaller power supply may be used. For example, the lift off voltage may be given by:

$$V_{liftoff}=13.5V-I_{loop}\times 0.375 \qquad \text{EQ. 2}$$

(This is simply one example relationship in the invention and is not limited to such a configuration.) According to Equation 2, when the loop is operating at 4 mA, the lift off voltage is 12 volts such that the maximum power supply required is 12 volts+4 mA×500 ohms=14 volts. Similarly, at a loop current of 12 mA, the lift off voltage is 9 volts such that the maximum power supply required is 9 volts+12 mA×500 ohms=15 volts. At a maximum loop current value of 20 mA on the loop, the lift off voltage is 6 volts such that the minimum power supply required is 6 volts+20 mA×500 ohms=16 volts. Thus, the loop in this scenario may be powered using a 16 volt power supply in contrast to a 22 volt power supply which would be required with a typical process device. A similar analysis can be illustrated to show that if a 24 volt power supply is used, a typical device with a 12 volt liftoff could operate with a maximum load resistance of no more than 600 ohms. However, by using the variable lift off voltage device of the present invention, the 24 volt power supply may be used in conjunction with a load resistance of no greater than 900 ohms.

Thus, a typical device (Eq. 1), the device power is limited by (min loop current)*(liftoff voltage)=3.6 mA*12 V=43.2 mW.

For a device in accordance with the present invention, (Eq. 2), the device power is limited by considering all loop currents:

At 3.6 mA liftoff is at 12.15 V, Available power is (3.6 mA)*(12.15)=43.7 mW (not much gain for the parameters chosen in Eq. 2)
At 4 mA liftoff is at 12 V, Available power is (4 mA)*(12)= 48 mW
At 20 mA liftoff is at 6 V, Available power is (20 mA)*(6)= 120 mW This shows that the limiting case is at minimum loop current where 43.7 mW is available to power the circuit.

Note that both devices provide nearly the same amount of power to the circuit; 43 mW.

Example 2

In this example, the power budget is increased by raising the lift off voltage above the traditional levels at low loop currents and lowering the lift off voltage at high loop currents. In this example, assume that the field device has a lift off voltage of 16 volts at 4 mA loop current and 12 volts at 20 mA loop current. This leads to Equation 3:

$$V_{liftoff}=17-I_{loop}\times 0.25 \qquad \text{EQ. 3}$$

At a loop current of 4 mA and 16 volts across the device terminals, the available power for the devices is 4 mA×16V=64 mW. If the load resistance is assumed to be 250 ohms, the typical field device would require a power supply voltage of 12+0.02*250=17V. The device with variable liftoff voltage requires a supply of 16+0.004*250=17V, the same as the typical device. Thus with this load resistor and a 17V power supply the new device has 64 mW available to power the device, versus only 48 mW with the typical device. The same advantage will be realized for load resistors greater than 250 ohms, but not for load resistors less than 250 ohms. This is similar (but not identical) to the devices depicted in FIG. 4. In contrast, the traditional device with a lift off voltage of 12 volts has only 4 mA×12V=48 mW of available power.

Figure 5:
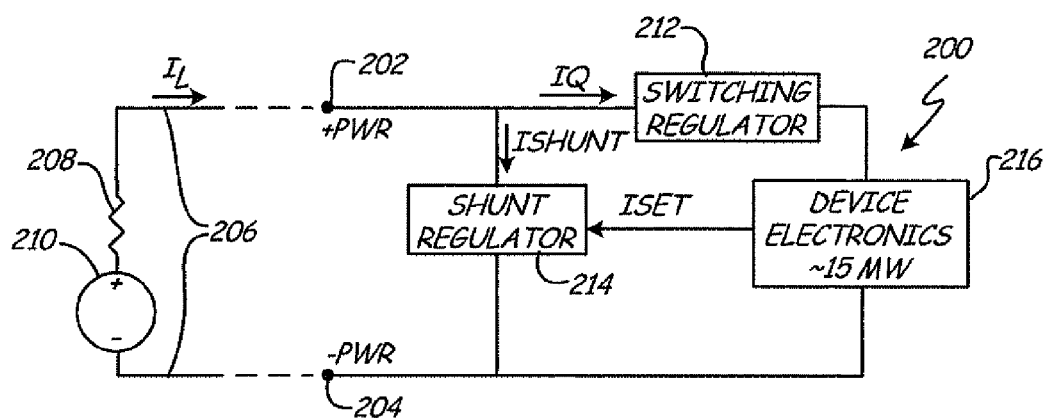
FIG. 5 is a block diagram of a prior art field device including a switching regulator.

FIG. 5 is a simplified block diagram of a prior art field device using a switching regulator which provides a variable lift off voltage. In FIG. 5, field device 200 includes first and second terminals 202 and 204 which couple to a two-wire process control loop 206. Two-wire process control loop 206 includes a loop resistor 208 and a power supply 210 and carries a loop current $I_L$. The field device 200 includes a switching regulator 212, a shunt regulator 214 and device electronics 216. In this example, the switching regulator 212 is considered to have 100% efficiency for simplicity. The switching regulator 212 efficiently takes power from the loop to operate the device electronics 216. Example electronics include a microprocessor, analog to digital converters, communication circuitry, sensor circuitry, etc. The shunt regulator 214 shunts the current which is not used to power the field device 200 back to the loop 206. Thus, the shunt current $I_{shunt}$ will be equal to the loop current $I_L$ minus the quiescent current used to power the device $I_Q$.

All of the quiescent current passes through the switching regulator 212. However, as this only supplies the power needed by the device, the current taken from the loop will decrease as the input voltage increases, as follows:

$$I_Q \times V_{IN} = I_{circuit} \times V_{circuit} \cong 15\ mW \qquad \text{EQ. 4}$$

Where $V_{IN}$ is the input voltage to the regulator, $V_{circuit}$ is the voltage provided to electronics 216 and $I_{circuit}$ is the current through electronics 216. This yields:

$$I_Q = \frac{P_{circuit}}{V_{IN}} \qquad \text{EQ. 5}$$

The circuit of FIG. 5 provides a quiescent current which decreases with an increase in input voltage. This provides a variable lift off voltage which allows the device to operate with a low quiescent current at high input voltages (with $I_{SET}$ at 4 mA) and a high quiescent current at low input voltage (with $I_{SET}$=20 mA). However, one problem associated with this configuration is that the terminal voltage can be relatively large, for example more than 40 volts. Typical switching regulators cannot operate at such high voltages which complicates the design of the circuitry. Another problem is that the switching regulator is directly coupled to the process control loop 206 and can introduce excess voltage noise into the loop due to uneven current consumption. This noise may disrupt digital communication or cause errors with loop current measurement.

Figure 6:
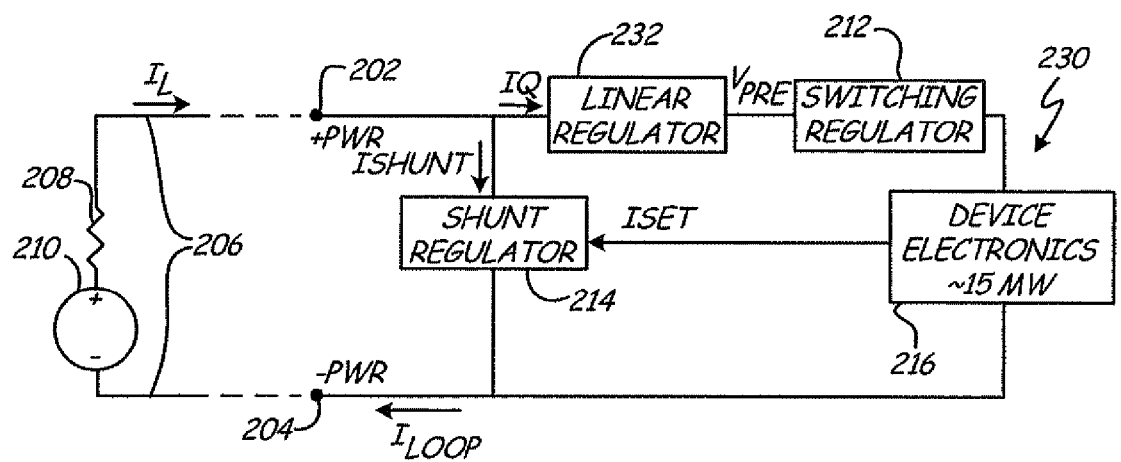
FIG. 6 is a block diagram of a diagram including a switching regulator and linear regulator.

One example solution to these problems is illustrated in FIG. 6. In FIG. 6, elements similar to those shown in FIG. 5 have retained their numbering. In the configuration illustrated in FIG. 6, the field device 230 includes a hybrid power supply circuit which includes a linear regulator 232. The linear regulator is used to supply a fixed preset regulated voltage $V_{PRE}$, such as 10 volts to the switching regulator 212. This configuration allows the use of a switching regulator 212 that need only accept a low input voltage (10 volts, for example), and is not required to handle large input voltages (40-50 volts) for example. Such a regulator requires fewer components and is less complex. Further, the configuration isolates the loop terminals 202 and 204 from noise associated with the switching regulator 212. However, in this configuration the quiescent current $I_Q$ is fixed and is independent of the terminal voltage.

Figure 7:
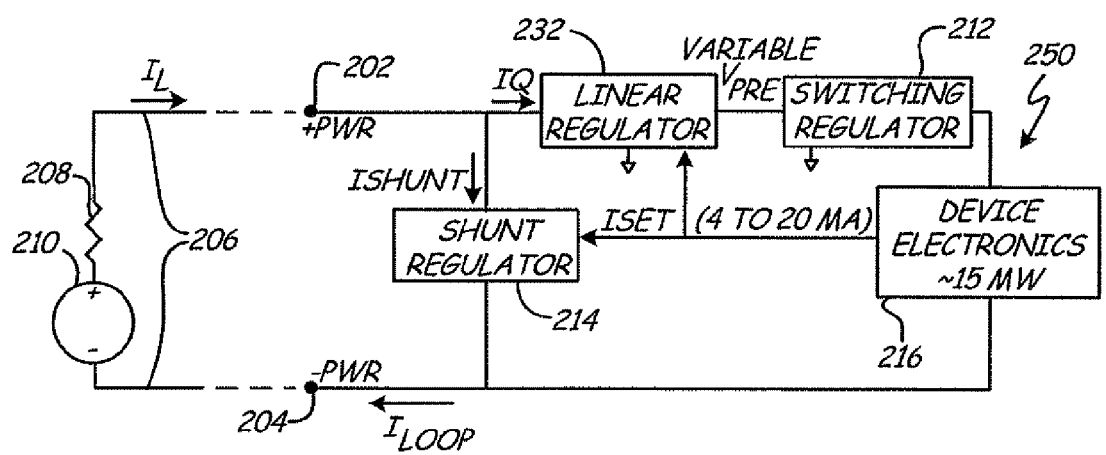
FIG. 7 is a block diagram of a field device including a switching regulator having a variable input voltage in accordance with the present invention.

FIG. 7 illustrates a field device 250 in accordance with one example embodiment of the present invention which provides a variable liftoff voltage. Elements in FIG. 7 which are similar to those shown in other FIGS. 5 and 6 have retained their numbering for simplicity. In the configuration illustrated in FIG. 7, the voltage provided to the switching regulator 212 ($V_{PRE}$) is variable and may be changed. More specifically, linear regulator 232 has a control input which receives a control signal from device electrons 216. In this example, $V_{PRE}$ changes as a function a control signal $I_{SET}$ provided by device electronics. $I_{SET}$ is used by shunt regulator to control $I_{LOOP}$ as a function of $I_{shunt}$.

For example, $V_{PRE}$ can be configured to be 10 volts when $I_{SET}$ sets the loop current to 4 mA. $V_{PRE}$ can decrease to 5 volts as a $I_{SET}$ sets the loop current to 20 mA. Under these conditions, if the device electronics 216 requires 15 mW of power, the quiescent current at 4 mA loop current will be 1.5 mA (15 mW/10 volts). Similarly, the quiescent current when $I_{SET}$ sets the loop current to 20 mA will be 3 mA (15 mW/5 volts). However, if the device electronics 216 requires 30 mW rather than 15 mW, the quiescent current doubles to 3 mA at a 4 mA loop current and 6 mA with a loop current of 20 mA.

The device of FIG. 7 will have a lift off voltage of 12 volts at 4 mA loop current and 7 volts at 20 mA loop current. Thus, the device 250 may operate with a system power supply of 24 volts and a load resistance 208 of up to 850 ohms. The additional power available to the device may be stored for future use or used to provide power to power intensive activities such as additional computation, diagnostics, etc. In one configuration, an additional wireless communication circuit is provided and is powered using these techniques.

The configuration set forth herein reduces the restrictions on the loop power supply and load resistance. Further, the configuration provides additional power to circuitry in the field device.

Although the present invention has been described with reference to preferred embodiments, workers skilled in the art will recognize that changes may be made in form and detail without departing from the spirit and scope of the invention.

The relationship between the voltage provided to the switching regulator and the loop current may have any desired relationship including linear and nonlinear relationships. The device electronics is illustrated as a regulator output controller (via $I_{SET}$) for the linear regulator. However, a separate regulator output controller may also be used.

What is claimed is:

1. A field device, comprising:
   field device circuitry configured to measure or control a process variable;
   a first process control loop terminal configured to couple to a two-wire process control loop, the two-wire process control loop carrying a loop current;
   a second process control loop terminal configured to couple to the two-wire process control loop;
   a switching regulator having an input and an output, the output coupled to the field device circuitry and arranged to provide power to the field device circuitry; and
   a variable voltage source having an input electrically coupled to the first process control loop terminal, and a voltage output coupled to the input of the switching regulator and a control input, wherein the voltage output is a function of the control input, wherein the voltage output changes inversely to the loop current flowing through the two-wire process control loop.

2. The apparatus of claim 1 wherein the voltage output from the variable voltage source has a non-linear relationship to loop current.

3. The apparatus of claim 1 wherein the voltage output from the variable voltage source has a linear relationship to loop current.

4. The apparatus of claim 1 including a shunt regulator configured to shunt current to the two-wire process control loop.

5. The apparatus of claim 1 wherein the variable voltage source comprises a voltage regulator.

6. The apparatus of claim 1 wherein the variable voltage source input is coupled to the field device circuitry.

7. The apparatus of claim 6 including a shunt current regulator configured to shunt current in excess of a quiescent current required by the field device, and wherein the shunt current regulator is responsive to the field device circuitry.

8. The apparatus of claim 1 wherein the field device comprises a transmitter.

9. The apparatus of claim 8 wherein the loop current is related to a process variable.

10. A method of powering a process field device, comprising:
    coupling first and second process control loop terminals of the field device to a two-wire process control loop, the two-wire process control loop carrying a loop current;
    receiving an input voltage at a switching regulator;
    providing power to field device circuitry from an output of the switching regulator from the input voltage; and
    controlling the input voltage to the switching regulator, wherein the input voltage to the switching regulator varies inversely to the loop current flowing through the two-wire process control loop.

11. The method of claim 10 wherein the voltage input to the switching regulator has a non-liner relationship to loop current.

12. The method of claim 10 wherein the voltage input to the switching regulator has a linear relationship to loop current.

13. The method of claim 10 including to shunting current to the two-wire process control loop.

14. The method of claim 10 wherein controlling the input voltage to the switching regulator comprises controlling a voltage regulator.

15. The method of claim 10 including controlling the loop current based upon a process variable.

* * * * *